United States Patent
Ray et al.

(10) Patent No.: US 7,653,156 B2
(45) Date of Patent: Jan. 26, 2010

(54) METHOD FOR FINE TIMING ACQUISITION

(75) Inventors: Gary A. Ray, Issaquah, WA (US); James B. Baker, Renton, WA (US)

(73) Assignee: The Boeing Company, Chicago, IL (US)

(*) Notice: Subject to any disclaimer, the term of this patent is extended or adjusted under 35 U.S.C. 154(b) by 735 days.

(21) Appl. No.: 11/379,418

(22) Filed: Apr. 20, 2006

(65) Prior Publication Data

US 2007/0248193 A1 Oct. 25, 2007

(51) Int. Cl.
*H04L 27/06* (2006.01)
*H04L 7/06* (2006.01)
*H03D 1/00* (2006.01)
*H04L 7/00* (2006.01)

(52) U.S. Cl. .................. 375/343; 375/364; 375/367

(58) Field of Classification Search .................. 375/364, 375/343, 367
See application file for complete search history.

(56) References Cited

U.S. PATENT DOCUMENTS

| | | | | | |
|---|---|---|---|---|---|
| 4,627,079 | A | * | 12/1986 | von der Embse | 375/343 |
| 5,282,227 | A | * | 1/1994 | Crawford | 375/327 |
| 5,726,658 | A | * | 3/1998 | Auslander et al. | 342/204 |
| 7,154,967 | B2 | * | 12/2006 | Boutros et al. | 375/343 |
| 7,224,721 | B2 | * | 5/2007 | Betz et al. | 375/152 |

FOREIGN PATENT DOCUMENTS

WO 0054424 9/2000

OTHER PUBLICATIONS

H. Dieter Luke, Senior Member, IEEE, Hans D. Schotten, Member IEEE, and Hafez Hadinejad-Mahram—Binary and Quadriphase Sequences With Optimal Autocorrelation Properties: A Survey—IEEE Transactions On Information Theory, vol. 49, No. 12, Dec. 2003.

Wai Ho Mow, Member, IEEE, and Shuo-Yen Robert Li, Senior Member, IEEE—Aperiodic Autocorrelation and Crosscorrelation of Polyphase Sequences—IEEE Transactions On Information Theory. 43, No. 3, May 1997.

(Continued)

*Primary Examiner*—David C Payne
*Assistant Examiner*—Nader Bolourchi
(74) *Attorney, Agent, or Firm*—McNees Wallace & Nurick, LLC (57) ABSTRACT

A method of processing a timing synchronization signal includes selecting an initial sequence of complex numbers and modifying the initial sequence based upon a metric applied to the autocorrelation function to enhance its autocorrelation properties within a predetermined window about the main autocorrelation peak determined by the timing uncertainty of the system. This two-step optimization process produces a new complex sequence used for timing acquisition. It is applied by transmitting the sequence through a medium and correlating the received signal against a known error-free sequence. Only correlation within the window of the bounded timing uncertainty is performed, thus saving valuable computational cycles. Also, because the sidelobe levels of the autocorrelated function are significantly lower within the timing uncertainty window than the sidelobe levels of a non-optimized autocorrelation function of a signal, the likelihood of finding a peak for the wrong timing signal is greatly reduced.

24 Claims, 6 Drawing Sheets

OTHER PUBLICATIONS

W.H. Mow and S.-Y.R. Li—Aperiodic Autocorrelation Properties of Perfect Polyphase Sequences—Dept. of Information Engineering, Chinese University of Hong Kong, Shatin, Hong Kong e-mail address: whmow@eng.ie.cuhk.hk—Singapore ICCS/ISITA '92.

Robert L. Frank, Senior Member, IRE—Polyphase Codes with Good Nonperiodic Correlation Properties—IEEE Transactions On Information Theory—1963.

Elders-Boll H et al: "Mismatched-filtering of concatenated spreading sequences for approximately synchronized CDMA-systems" Vehicular Technology Conference, 1996; Mobile Technology for the Human Race, IEEE 46th Atlanta, GA, USA Apr. 28-May 1, 1996, New York, NY, USA, IEEE, US, vol. 3, Apr. 28, 1996, pp. 1727-1731, XP010162688 ISBN: 0-7803-3157-5 section I; section III, A-B figure 2.

Elders-Boli H et al: "Fast acquisition in DS-CDMA using concatenated spreading sequences" Signal Processing Advances in Wireless Communications, First IEEE Signal Processing Workshop on Paris, France Apr. 16-18, 1997, New York, NY, USA, IEEE, US, Apr. 16, 1997, pp. 373-376, XP010251406 ISBN: 0-7803-3944-4 section I, lines 5-8 p. 373, right-hand column, paragraphs 1, 2 p. 373, left-hand column, lines 1-4.

* cited by examiner

METHOD FOR FINE TIMING ACQUISITION

BACKGROUND OF THE INVENTION

The present invention relates generally to a timing acquisition or synchronization method using pseudo-noise (PN) sequences. More particularly, the present invention provides a method for timing acquisition that is based on a bounded timing uncertainty.

Timing acquisition and synchronization is a critical element of many modem electronic systems, such as Digital Communications Systems, Radar Systems, and Digital Signal Processing Systems. The subject of receiver synchronization is discussed in most books on digital communications (see, for example, Sklar, B, *Digital Communications*, $2^{nd}$ Ed., Chapter 10, Prentice Hall, Upper Saddle River, N.J., 2001), and, indeed, entire books have been written on the subject of receiver synchronization within digital communications systems (Mengali, U, *Synchronization Techniques for Digital Receivers*, Springer, New York, N.Y., 1997; Meyr, H. et al, *Synchronization in Digital Communications*, John Wiley & Sons, Hoboken, N.J., 1990), all of the foregoing books being hereby incorporated by reference. In many applications, such as the extremely dense signal environment of a cellular phone system, the very low signal-to-noise-ratio communications channel of a deep space probe, or the very narrowband system employed by a digital modem in most personal computers, highly efficient signal synchronization techniques are desired. The act of synchronization within a receiver essentially involves replicating the timing information contained in the transmitted signal within the receiver, so that the data information modulated or encoded within the transmitted signal can be extracted. Without first obtaining synchronization, no data information can be extracted from the transmitted signal, and the communications link will fail. Hence, timing acquisition is one of the first processes that takes place when a communications link between a receiver and a transmitter is established.

A well-known technique employed widely in the systems mentioned above is the use of PN sequences for timing acquisition and synchronization. Additionally, due to improved clocks and the omnipresence of GPS, accurate time references are widely available at receivers for use in timing acquisition. Thus, when sending a PN sequence to achieve timing acquisition for many different applications that also have access to GPS and/or improved clocks, the timing uncertainty of these systems has been greatly reduced, resulting in an a priori bound on the timing uncertainty. Because of this bounded timing uncertainty, it is possible to employ shortened timing acquisition PN sequences, or to transmit signals having less power, or to trade other system resources in order to reduce the system overhead associated with the timing acquisition process as a result of the bounded timing uncertainty.

Although the improved clocks have improved the timing acquisition process and created a bounded timing uncertainty, the timing acquisition process is still far from ideal. Systems incorporating timing acquisition sequences range from military applications such as Low Probability of Interception (LPI) and spread spectrum communications to commercial networking applications such as WiFi. Any method that makes the timing acquisition process more efficient for a system has a direct impact on improving the overall performance of the system.

Current systems that use timing acquisition techniques require computation of the autocorrelation properties of the PN sequence over the entire length of the PN sequence. This autocorrelation requirement results in a need for the system to employ longer PN sequences. Further, in a spread spectrum application, the timing acquisition process for the spreading sequence requires more time, which limits the range of the system, and requires greater signal power. Additionally, it is not possible to separate the PN sequence detection process from the timing acquisition process in these spread spectrum sequences. PN detection requires a certain length PN sequence for the system to obtain the necessary correlation gain for the application. Also, the main autocorrelation peak of the PN sequence must be reliably distinguished from all of the sidelobe peaks of the PN sequence.

Real world systems that use timing acquisition methods include Wireless Local Area Network (WLAN) technology including I.E.E.E. Standards 802.11(a), (b) and (g). WLAN is a widely used application in which CDMA or spread spectrum techniques use PN sequences to transmit data. Those sequences have unique characteristics that allow synchronization (timing acquisition) via correlation. Advanced forms of these WLAN protocols could benefit from improvement to timing acquisition.

Bluetooth® technology is a short range spread spectrum system for sending audio to headsets or data between closely spaced devices, e.g., a sensor and a laptop computer. It is widely used in "so-called" Bluetooth® headsets for receiving stereo signals wirelessly in a small area (e.g., the inside a car or within a room). Again, advanced forms of the Bluetooth® protocol could benefit from improvements to timing acquisition.

WiMAX is a wide area network protocol similar to the WLAN protocols but for longer distance communications at higher data rates and is designed to compete with cellular technology and last-mile solutions involving fiber. Further, UWB for video transmission uses even more signal spreading in time as well as frequency (up to 500 MHz in bandwidth) than that used by the WLAN and Bluetooth® protocols. UWB operates within the same bands as many other signals and so must be very low in power. Hence synchronization sequences are used in order to synchronize these very low power signals reliably. Again, advanced forms of these protocols could benefit from improved timing acquisition.

All of the previous techniques describe essentially signal synchronization using PN sequences and correlation. PN sequences and correlation can also be used at a higher level within packetized protocols, which are already symbol synchronized. Each frame (or packet) is sent independently in many applications and frame or packet synchronization must be done to find the beginning of each frame or packet. Frame synchronization for packetized systems may also benefit from improved timing acquisition.

Thus, in view of the disadvantages of the current methods and systems, what is needed is a method to reduce the system resources spent in the timing acquisition process.

SUMMARY OF THE INVENTION

The present invention is directed to a method for designing and detecting a timing synchronization signal for a signal processing system. The method includes the steps of providing an initial sequence comprised of a plurality of complex numbers, the initial sequence having a predetermined autocorrelation property; generating an autocorrelation function of the initial sequence; generating a phase-adjusted autocorrelation vector of the initial sequence by application of a minimization function; determining a timing uncertainty characteristic of the system; correlating the phase-adjusted autocorrelation function about a center portion of the phase-adjusted autocorrelation function defined by the timing uncertainty characteristic; and detecting a timing synchronization signal by a highest peak of the correlated center portion of the phase-adjusted autocorrelation function. The initial sequence is preferably a complex sequence, which has an autocorrelation function with a large peak-to-sidelobe ratio. Such an initial sequence is preferably a Frank sequence. Also, the preferred minimization technique comprises a pseudo-Newton algorithm, for example, a Broyden-Fletcher-Goldfarb-Shanno (BFGS) algorithm.

In another aspect of the invention, there is a method for implementing a timing acquisition process at a transmitter. The method includes the steps of generating a sequence having predetermined autocorrelation properties within a timing uncertainty window, processing the sequence with a timing clock to generate a timing signal and sending the generated timing signal.

In still another aspect of the invention, there is a method for implementing a timing acquisition process at a receiver. The method includes the steps of receiving a timing signal, correlating a phase adjusted autocorrelation function sequence having predetermined autocorrelation properties within a timing uncertainty window against the received timing signal and determining a timing clock signal using the correlated signal.

One advantage of the present invention is that the system creates more efficient physical layer communications and networking protocols. This is because such protocols typically define a portion of bits to be used for synchronization only. Thus, the timing bits are unavailable for sending data and therefore constitute some of the overhead of the physical layer protocol. The present invention can be used to reduce the number of bits required and hence reduce the overhead.

Another advantage of the present invention is that there are more degrees of freedom when designing the overall systems because a smaller percentage of the transmitted bits are devoted to overhead functions. Thus, the designer can perform more design tradeoffs by using these extra bits for other overhead functions or for sending more data.

Yet another advantage of the present invention is the ability of the designer to separate the two problems of PN sequence detection and timing uncertainty. This allows the designer to separately address each problem to come up with a single PN sequence which meets both detection and timing requirements, but is not over-designed for one or the other.

Another advantage of the present inventions is that the system may be expanded to longer distances, send more data or use less power for transferring data.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The timing acquisition process of the present invention includes selecting an initial sequence of complex numbers having preferred autocorrelation properties, and applying a two-step method to the initial sequence of complex numbers to enhance the autocorrelation properties of the initial sequence within a predetermined window defined by the bounded timing uncertainty of the system.

The timing acquisition process of the present invention preferably uses one or more computational or analytical processes to either generate a timing signal for transmission or detect a timing signal at a receiver. In one embodiment, the computational or analytical processes can be implemented by software stored in a memory device and executable by a microprocessor. The computational or analytical processes may also be implemented and executed using digital and/or analog hardware.

The system is implemented by selecting a complex number sequence (these would typically lie on the unit circle having preferred autocorrelation properties). Preferably the complex number sequence is a zero-shift autocorrelation value that is much greater than any non-zero shift autocorrelation value, hence having a large peak-to-sidelobe level. Many such complex number sequences are known, for example, Chu sequences, Frank sequences, Lee sequences, Barker sequences, and Golomb sequences. The present invention may be practiced with these and other complex number sequences having the characteristic of a large peak-to-sidelobe level in their autocorrelation functions. Complex number sequences having autocorrelation functions with large peak-to-sidelobe levels are well known by those skilled in the art to have extensive applications in spread-spectrum communications, system identification, and radar.

Figure 1:
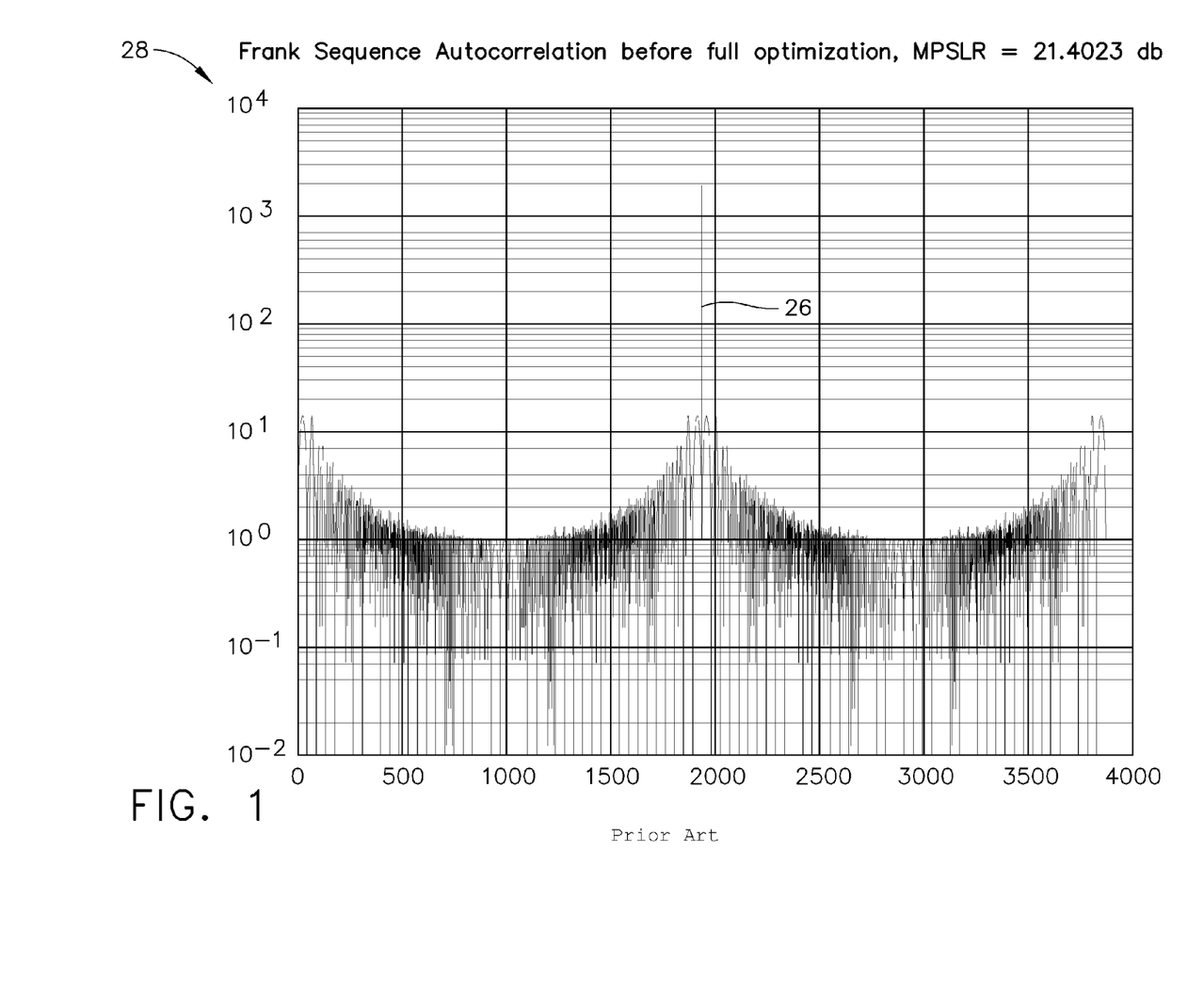
FIG. 1 shows an autocorrelation function of a Frank sequence.

A preferred complex number sequence is selected from a general family of complex number sequences known as Frank sequences. Frank sequences are described in *"Polyphase Codes with Good Nonperiodic Correlation Properties"*, Robert L. Frank, IEEE Trans. Inform. Theory 9.43-45 (1963), which is hereby incorporated by reference. FIG. 1 shows an autocorrelation function 28 of a Frank sequence. The Frank sequence has a length $N=m^2$, i.e., a squared integer, and is defined mathematically as:

for $i,k=0,1,\ldots,m-1$ and $N=m^2$ $$s(k+im)=W_m^{ki} \qquad \text{Equation 1}$$

Also for the Frank sequence, the minimum side peak autocorrelation of the unshifted Frank sequences with length $N=m^2$ is:

$$\min_r \left\{ \max_{1 \le i \le N-1} \{|C_i(t)|\} \right\} = \left| C_i\left( \left[ \frac{m-1}{2} \right] \right) \right| \qquad \text{Equation 2}$$

$$= \left| \sum_{n=0}^{\left[\frac{m-1}{2}\right]} W_m^n \right|,$$

where $[x]$ is the integer part of x. The last term involves a geometric sum, which equals:

$$\left|\frac{W_m^{\left[\frac{m+1}{2}\right]}-1}{W_m-1}\right| = \left|\frac{W_m^{\left[\frac{m+1}{2}\right]/2}-W_m^{-\left[\frac{m+1}{2}\right]/2}}{W_m^{1/2}-W_m^{-1/2}}\right| \quad \text{Equation 3}$$

$$= \left|\frac{\sin\left(\pi\left[\frac{m+1}{2}\right]/m\right)}{\sin(\pi/m)}\right| \quad \text{Equation 4}$$

As $m \to \infty$:

$$\min_r \{\max_{1 \le i \le N-1} \{|C_s(t)|\}\} \to \frac{\sin(\pi/2)}{\pi/m} = \frac{m}{\pi}. \quad \text{Equation 5}$$

Therefore, the maximum peak to side peak ratio of the original Frank sequence is close to $$\pi m \approx 3.142\sqrt{N} \text{ for large N}. \quad \text{Equation 6}$$

See M. H. Mow and S.-Y. Li, *Aperiodic Autocorrelation Properties of Perfect Polyphase Sequences*, ICCS, pp. 1232-1234, 1992, which is hereby incorporated by reference. An alternative algorithm for the Frank sequence is as follows:

$k=0{:}m-1$ for $j=0{:}m-1$      Equation 7

$q(j*m+k+1)=\exp(2*pi*i*j*k/m);$ end where m is any selected value.

Figure 2:
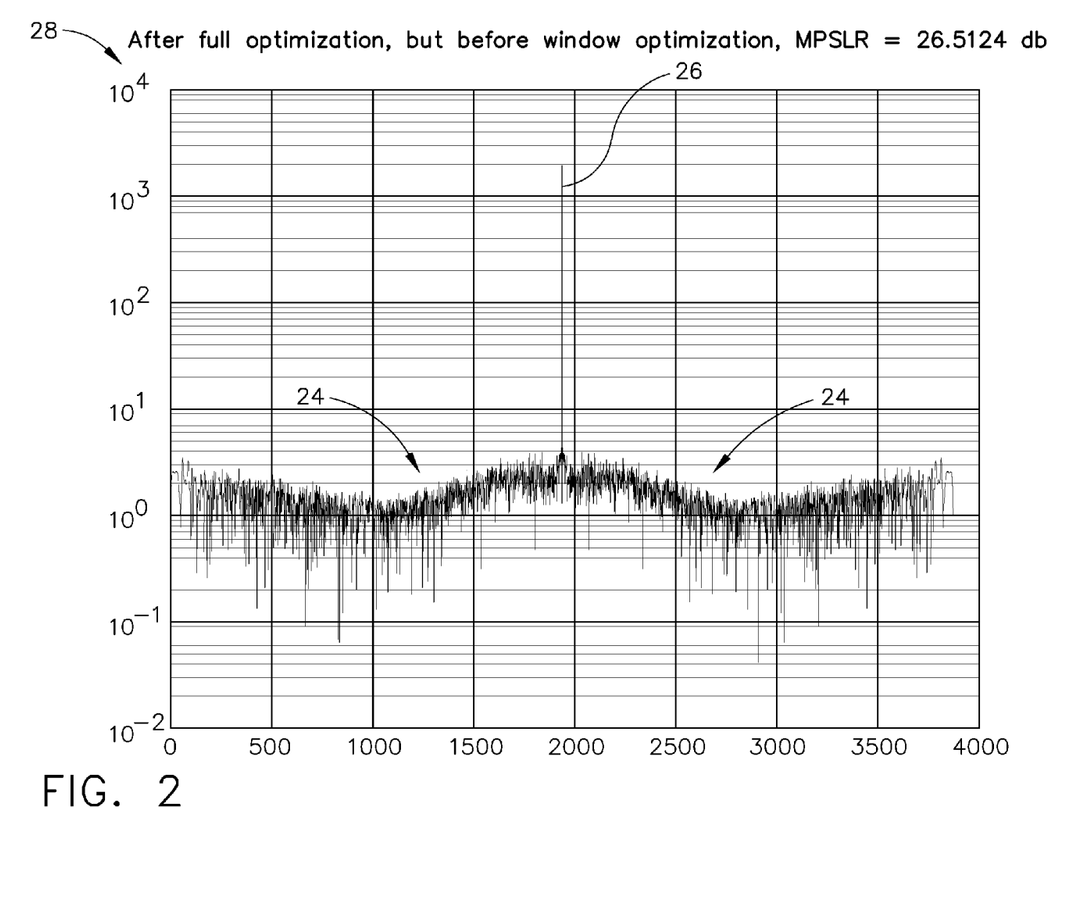
FIG. 2 shows the autocorrelation function of the sequence that has been optimized over the entire sidelobe region.

Next, the present invention uses a continuous function of the autocorrelation as the function to be minimized. The continuous function is chosen so that a continuous high variable count optimization method can be used, such as the Broyden-Fletcher-Goldfarb-Shanno (BFGS) minimization algorithm. Applying the minimization algorithm to the sequence adjusts the phases of all the complex numbers in the sequence simultaneously resulting in the autocorrelation function like that shown in FIG. 2. The BFGS minimization algorithm is a gradient descent method used to solve unconstrained nonlinear optimization problems. This minimization algorithm reduces all of the autocorrelation sidelobes 24 that surround the main maximum peak 26 in the sequence 28. The BFGS minimization algorithm approximates the second derivatives of the function to be fit, by analyzing successive gradient vectors. This approximation allows the application of a quasi-Newton fitting method in order to move towards the minimum in the parameter space, which assumes that the function can be approximated as a quadratic in the region of interest.

In a preferred method of the invention, the fourth power of the autocorrelation vector is used as the optimization metric. This metric is preferred because it measures the "peakiness" of the autocorrelation very well, and because the fourth power of the autocorrelation function is a continuous function of the optimization variables, which are the original sequence elements (in this particular example, the variables are in fact the phases of the original sequence). While the fourth power of the autocorrelation is preferred, other metrics such as the sum of the squares or any other continuous peak function may be used as the optimization metric. In addition, other multivariable non-linear optimization methods could be applied to this problem. There are, for example, many such multivariable non-linear optimization methods that fall within the category of pseudo-Newton Methods.

The BFGS algorithm is the preferred algorithm because using this continuous optimization method makes the problem tractable. Ordinarily, the optimization would be a very difficult problem since the number of variables is large. When using the phases as the variables in this example, the number of real variables is N, the length of the Frank sequence.

Figure 3:
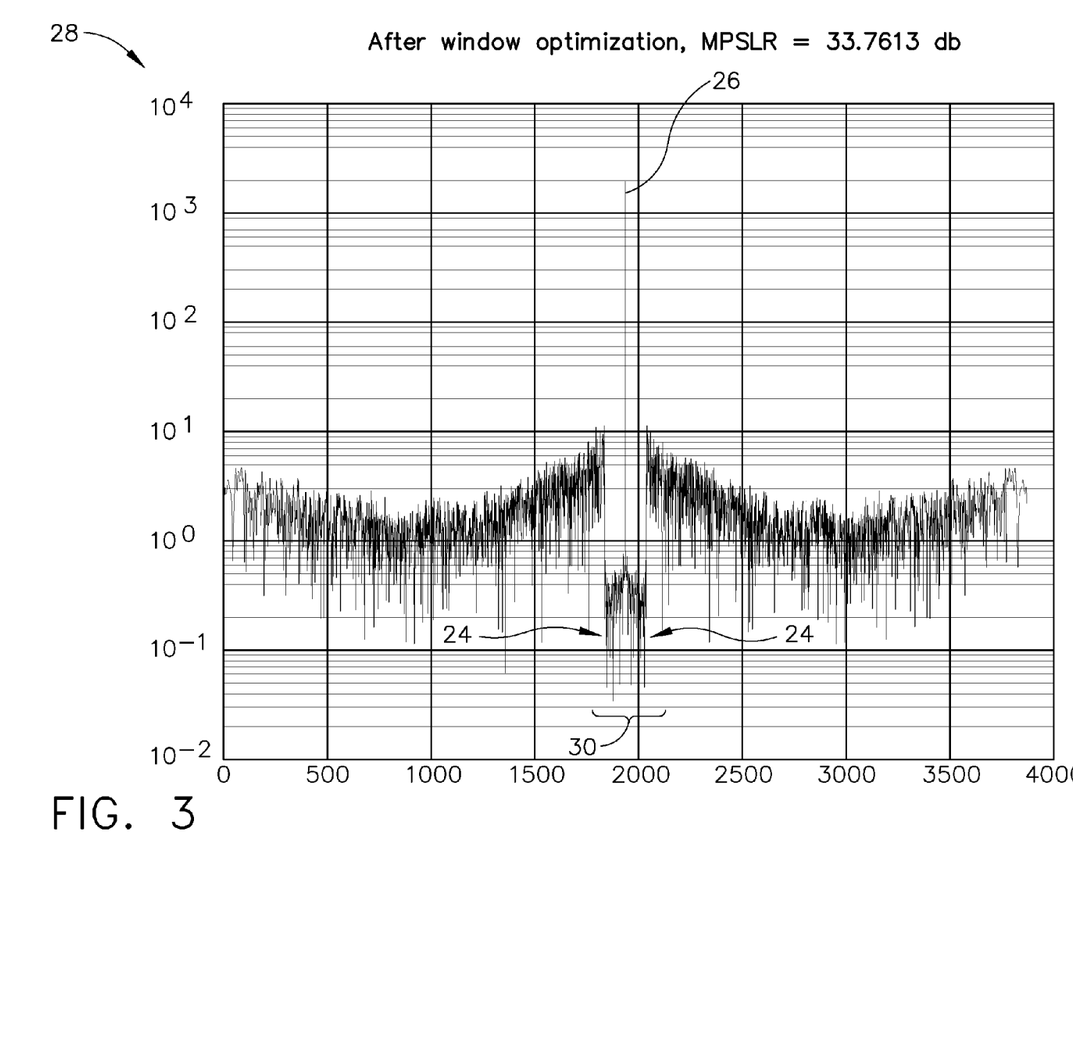
FIG. 3 shows the autocorrelation function of the sequence that has been optimized over the window of timing uncertainty.

After the autocorrelation function 28 of the Frank sequence is optimized using the BFGS minimization algorithm, the bounded timing uncertainty is evaluated as shown in FIG. 3. The optimization function is modified to sum only the window of optimization 30 for the system. For each individual system, the window of optimization 30 is determined by the individual system's maximum timing uncertainty. After computing the autocorrelation of the new optimized sequence the sidelobe levels 24 drop within the timing uncertainty window 30 surrounding the maximum peak in the autocorrelated sequence, resulting in improved system performance.

After the sidelobe levels 24 are dropped in the timing uncertainty window 30 and the signal has been isolated within the timing uncertainty window 30, the signal is finally correlated within the timing uncertainty window 30 rather than over the entire length of the autocorrelated sequence. This reduces the probability of selecting the wrong peak of the autocorrelation function, which would result in incorrect timing.

Figure 4:
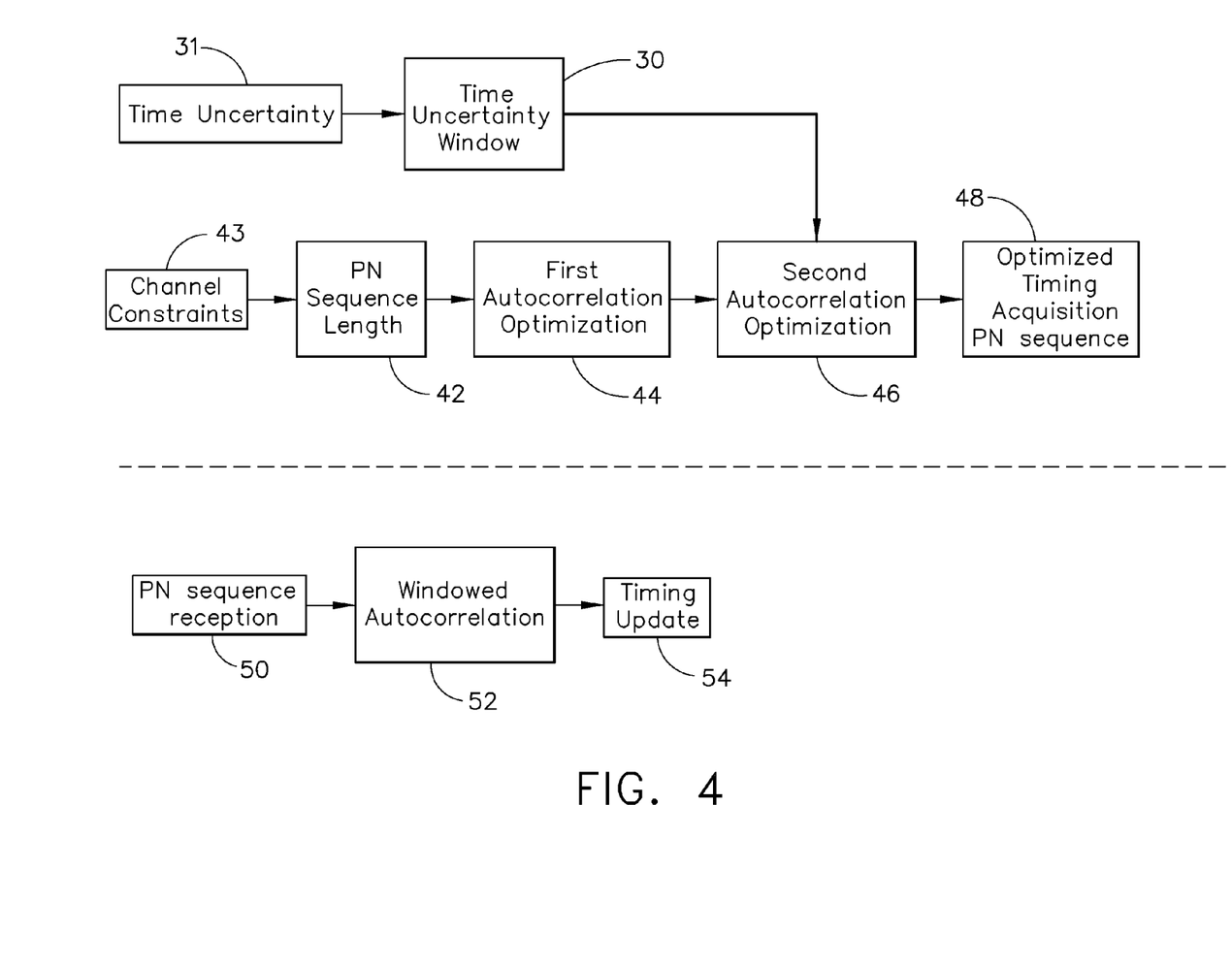
FIG. 4 is a diagram illustrating the basic structure of the present invention.

FIG. 4 illustrates the embodiment of the present invention in which the design of the PN sequence combined with the windowed autocorrelation produces a more efficient timing sequence for the synchronization process. Preferably the PN sequence 42 is selected by considering channel constraints 43 in the applicable system. Channel constraints 43 are determined based on the transmission medium through which the signal is propagated, and other signal-corrupting factors associated with the transmission medium. First, the PN sequence is selected and the length of the PN sequence is determined at step 42, and the system proceeds to step 44. A first autocorrelation of the selected PN sequence is performed at step 44, and a second autocorrelation optimization is calculated at step 46. The second autocorrelation optimization function 46 is computed by factoring in the time uncertainty window 30 of the autocorrelation sequence. The time uncertainty window 30 is a function of the predetermined timing uncertainty 31 of the system hardware. An optimized timing acquisition PN sequence is generated at step 48 using the timing uncertainty to enhance detection of the timing signal.

The portion of FIG. 4 below the dotted line shows how a system uses the new optimized PN sequence in operation. During the system's timing acquisition process, the PN sequence 50 is input to the windowed autocorrelation sequence 52. The windowed autocorrelation sequence 52 includes the steps set forth in the preceding paragraph. The windowed autocorrelation sequence 52 then generates an updated timing signal at step 54.

Figure 5:
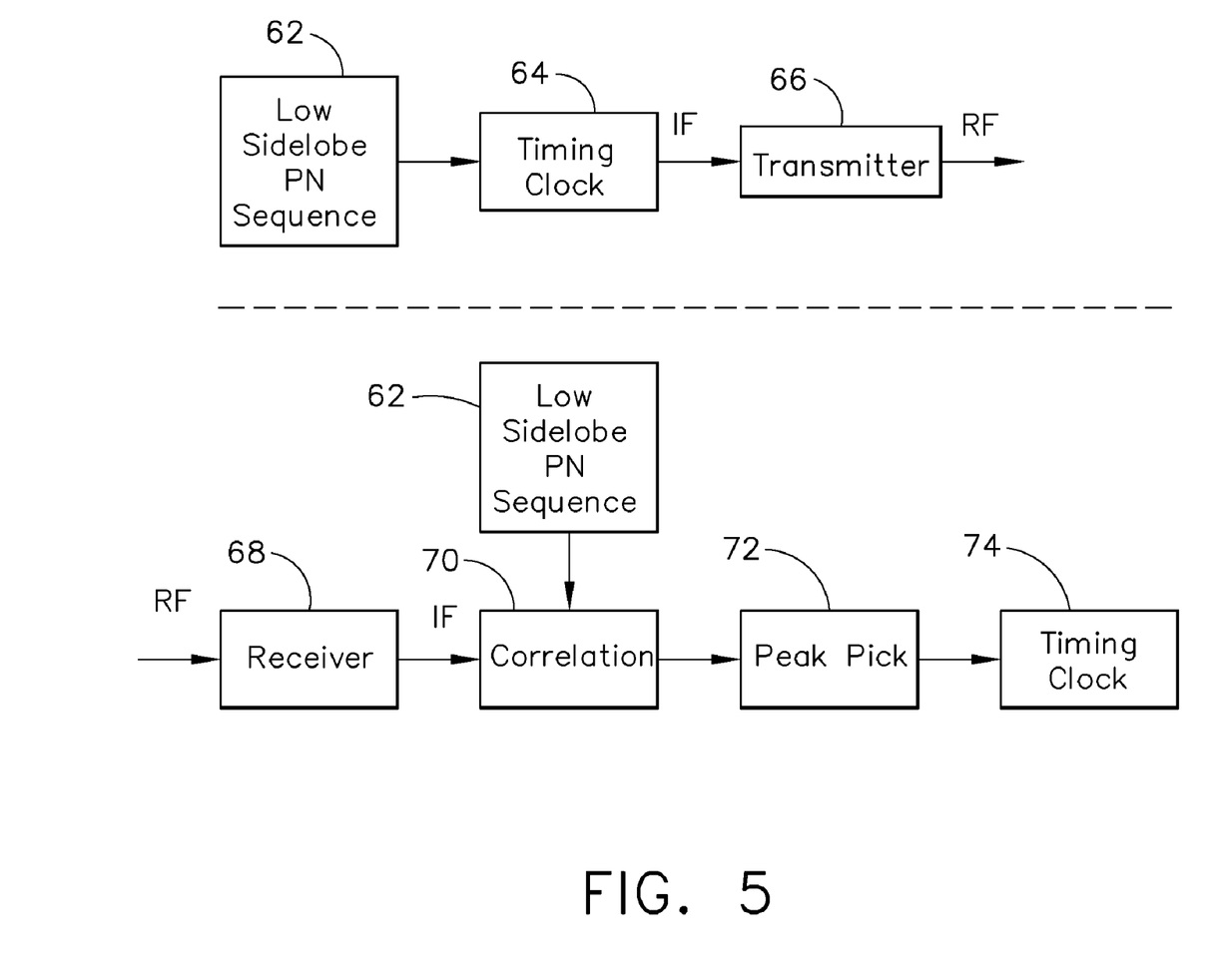
FIG. 5 is a diagram of another embodiment of the present invention.

Referring next to FIG. 5 the present invention is shown in the context of the transmitter of the timing sequence (upper portion) and the receiver of the timing sequence (lower portion). The timing clock provides a timing signal that must be transmitted along with data. The low sidelobe autocorrelation sequence as described above replaces the PN sequence used in previous system. The autocorrelated low sidelobe PN sequence 62 is processed by timing clock 64, to generate a timing update, and the timing signal is then transmitted by transmitter 66. A receiver 68 receives the signal and processes it. The low sidelobe PN sequence 62 is correlated against the received timing signal and a peak is chosen at step 72, which then determines the received timing clock at step 74.

Figure 6:
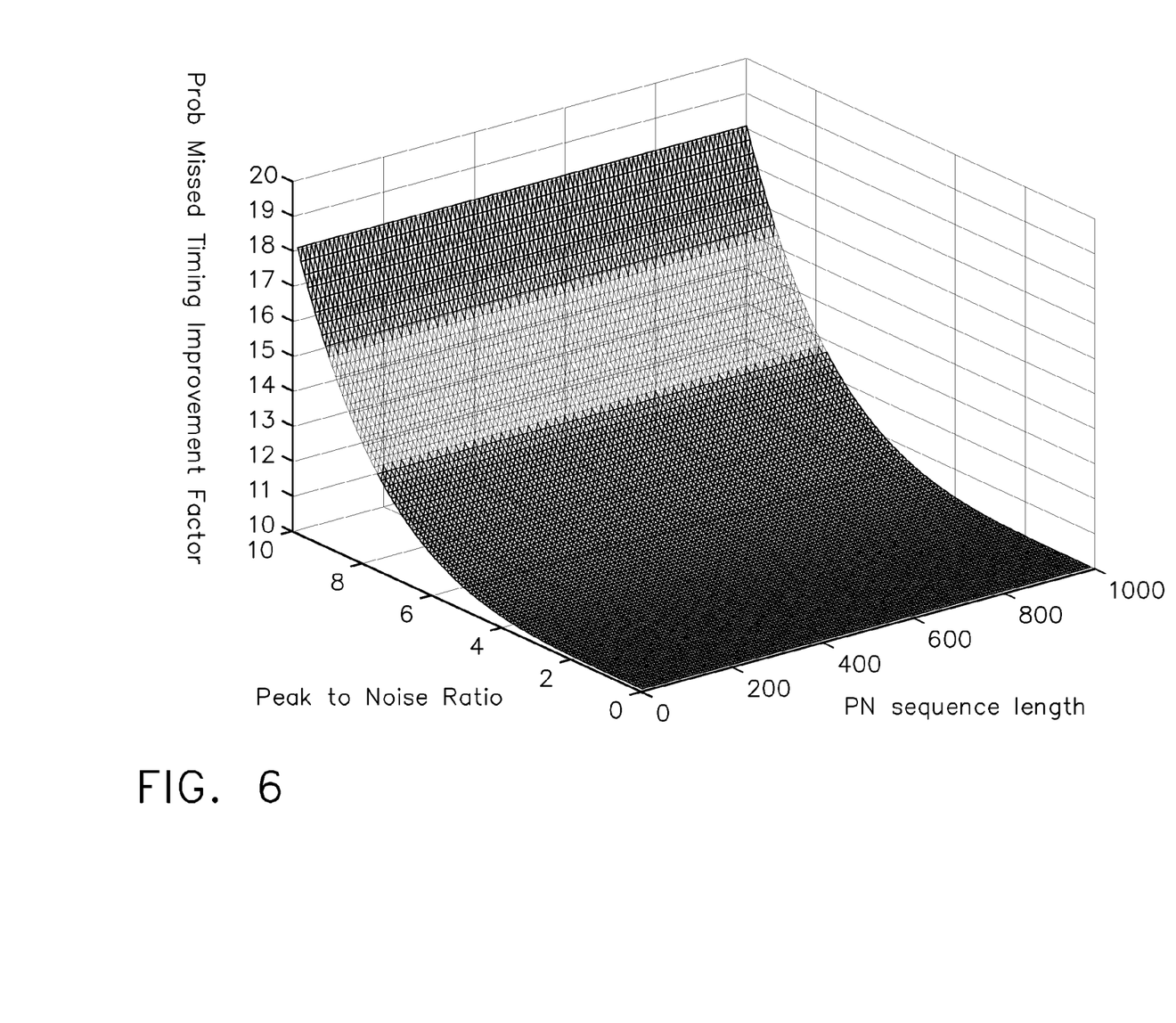
FIG. 6 is a graph showing the probability of missed timing improvement factor for the present invention as a function of the peak-to-noise ratio and the PN sequence length.

Referring next to FIG. 6, the timing uncertainty window 30 is assumed to be a predetermined fraction—for example, 1/10—of a total PN sequence length N and a Frank sequence is used as the comparison for sidelobe levels 24. As shown in the figure, the missed timing improvement factor is at least the ratio of PN sequence length to timing uncertainty window 10 because the timing peak must lie within the timing uncertainty window which is 10 times smaller than the total PN sequence window. In addition, as the noise level drops, the missed timing probability is further improved, in this case showing improvement up to 18 times.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for detecting a timing synchronization signal for a signal processing system comprising:
   providing an initial sequence comprised of a plurality of complex numbers, the initial sequence having a preferred autocorrelation property;
   generating an autocorrelation function of the initial sequence;
   generating a phase-adjusted autocorrelation vector of the initial sequence by application of a minimization technique;
   determining a timing uncertainty characteristic of the system;
   correlating the phase adjusted autocorrelation vector of the initial sequence with a received timing signal within a timing uncertainty window defined by the timing uncertainty characteristic to determine a phase-adjusted autocorrelation function; and
   detecting a timing synchronization signal by a highest peak of the correlated center portion of the phase-adjusted autocorrelation function; and
   synchronizing the timing synchronization signal with a received signal to extract data information from a transmitted signal.

2. The method of claim 1 wherein the initial sequence comprises a sequence derived from a unit circle, wherein the autocorrelation property is configured such that a zero shift autocorrelation value of the initial sequence is much greater than any non-zero shift autocorrelation value of the initial sequence.

3. The method of claim 2 wherein the initial sequence is selected from a group consisting of the following sequences: a Frank sequence, a Chu sequence, a Lee sequence, a Barker sequence, and a Golomb sequence.

4. The method of claim 1 wherein the minimization technique comprises a pseudo-Newton algorithm.

5. The method of claim 4, wherein the pseudo-Newton algorithm is represented in a Matlab format as:

$k=0:m-1$ for $j=0:m-1$ $q(j*m+k+1)=\exp(2*pi*i*j*k/m);$ end where m is any selected value.

6. The method of claim 4, wherein the pseudo-Newton algorithm is defined as follows:

$s(k+im)=W_m^{ki}$ for i, k=0, 1, . . . , m−1 and N=m$^2$.

7. The method of claim 1 wherein the autocorrelation vector is an optimization metric.

8. The method of claim 7 wherein the optimization metric is selected from a group consisting of the fourth power of the autocorrelation vector, the sum of the squares, continuous peak functions, and multivariable non-linear optimization methods.

9. The method of claim 8 wherein the multivariable non-linear optimization method is the Broyden-Fletcher-Goldfarb-Shanno (BFGS) algorithm.

10. The method of claim 1 wherein the timing synchronization signal is provided by a timing clock that is transmitted simultaneously with data, and the initial sequence is a sequence having predetermined autocorrelation properties.

11. The method of claim 10 wherein the sequence having predetermined autocorrelation properties is correlated against the timing synchronization signal.

12. A method for implementing a timing acquisition process at a transmitter, the method comprising the steps of:
    generating a sequence having preferred autocorrelation property within a timing uncertainty window;
    processing the sequence with a timing clock to generate a timing signal; and
    sending the generated timing signal;
    wherein generating the sequence comprises:
      providing a complex number sequence;
      generating an autocorrelation function of the initial sequence;
      generating a phase adjusted autocorrelation vector for the complex number sequence by application of a minimization technique;
      correlating the phase adjusted autocorrelation function vector with the generated timing signal; and
      determining a timing uncertainty characteristic of the system.

13. The method of claim 12 wherein the complex number sequence is selected from a group consisting of: a Frank sequence, a Chu sequence, a Lee sequence, a Barker sequence, and a Golomb sequence.

14. The method of claim 12 wherein the minimization technique comprises a pseudo-Newton algorithm.

15. The method of claim 14 wherein the pseudo-Newton algorithm is represented in a Matlab format as:

$k=0:m-1$ for $j=0:m-1$ $q(j*m+k+1)=\exp(2*pi*i*j*k/m);$ end where m is any selected value.

16. The method of claim 14 wherein the pseudo-Newton algorithm is defined as follows:

$s(k+im)=W_m^{ki}$ for i, k=0, 1, . . . , m−1 and N=m$^2$.

17. The method of claim 12 wherein the autocorrelation vector is an optimization metric.

18. The method of claim 17 wherein the optimization metric is selected from a group consisting of the fourth power of the autocorrelation vector, the sum of the squares, continuous peak functions, and multivariable non-linear optimization methods.

19. The method of claim 18 wherein the multivariable non-linear optimization method is the Broyden-Fletcher-Goldfarb-Shanno (BFGS) algorithm.

20. The method of claim 12 wherein the timing synchronization signal is provided by a timing clock that is transmitted simultaneously with data, and the initial sequence is a sequence having predetermined autocorrelation properties.

21. The method of claim 20 wherein the initial sequence is correlated against the timing synchronization signal.

22. A method for implementing a timing acquisition process at a receiver, the method comprising the steps of:
   determining a timing uncertainty characteristic of a system;
   receiving a timing signal;
   correlating a phase adjusted autocorrelation function sequence having a preferred autocorrelation property within a timing uncertainty window determined from the timing uncertainty characteristic against the received timing signal to generate a correlated signal; and
   determining a timing clock signal using the correlated signal.

23. The method of claim 22 wherein the step for determining a timing clock signal includes selecting a peak from the correlated signal.

24. The method of claim 22 wherein the step for determining a timing clock signal includes detecting a timing synchronization signal by a highest peak of a correlated center portion of the phase adjusted autocorrelation function.

* * * * *

UNITED STATES PATENT AND TRADEMARK OFFICE
CERTIFICATE OF CORRECTION

PATENT NO. : 7,653,156 B2  Page 1 of 1
APPLICATION NO. : 11/379418
DATED : January 26, 2010
INVENTOR(S) : Ray et al.

It is certified that error appears in the above-identified patent and that said Letters Patent is hereby corrected as shown below:

Column 4, line 45, "9 43-45" ...should be --"9:43-45"--
Column 4, line 59, Equation 2, subscript "i" under the word "max" ...should be a --subscript "t"--
Column 4, lines 59-64, Equation 2, the subscripts on the two occurrence of "C" ...should be a --subscript "s" not an "i"--
Column 5, lines 10-13, Equation 5, the subscript "i" after the word "max" ...should be a --subscript "t"--

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,653,156 B2 Page 1 of 1
APPLICATION NO. : 11/379418
DATED : January 26, 2010
INVENTOR(S) : Ray et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this

Twenty-third Day of November, 2010

David J. Kappos
*Director of the United States Patent and Trademark Office*